United States Patent
Harris (10) Patent No.: US 9,154,535 B1
(45) Date of Patent: Oct. 6, 2015

(54) CONTENT DELIVERY SYSTEM WITH CUSTOMIZABLE CONTENT

(71) Applicant: Scott C. Harris, Rancho Santa Fe, CA (US)

(72) Inventor: Scott C. Harris, Rancho Santa Fe, CA (US)

( * ) Notice: Subject to any disclaimer, the term of this patent is extended or adjusted under 35 U.S.C. 154(b) by 319 days.

(21) Appl. No.: 13/791,802

(22) Filed: Mar. 8, 2013

(51) Int. Cl.
*G06F 15/16* (2006.01)
*H04L 29/06* (2006.01)
*G06F 21/00* (2013.01)
*G06F 15/173* (2006.01)

(52) U.S. Cl.
CPC ...................................... *H04L 65/60* (2013.01)

(58) Field of Classification Search
CPC ............. G06F 17/30017; G06F 17/30026; G06F 17/3074; G06F 17/30749; G06F 17/30752; G06F 17/30758; G06F 17/30772; G06F 17/30775; G06F 17/30867; G06F 17/30554; H04N 21/4755; H04N 21/252; H04N 21/458; H04N 21/4622; H04N 21/4756; H04N 21/4825; H04N 21/6125; H04N 21/658; H04H 60/46; H04L 65/4084; H04L 65/4092; H04L 67/02; H04L 67/30; H04L 67/306; H04L 67/325
USPC .............. 709/217, 231, 234; 715/716; 705/52
See application file for complete search history.

(56) References Cited

U.S. PATENT DOCUMENTS

| | | | |
|---|---|---|---|
| 7,792,845 B1 * | 9/2010 | Binns | 707/754 |
| 8,356,031 B2 * | 1/2013 | Hyman | 707/728 |
| 8,880,599 B2 * | 11/2014 | Svendsen et al. | 709/204 |
| 2002/0091790 A1 * | 7/2002 | Cubley | 709/217 |
| 2003/0182437 A1 * | 9/2003 | Kobayashi et al. | 709/232 |
| 2004/0205107 A1 * | 10/2004 | Yoon | 709/200 |
| 2005/0102427 A1 * | 5/2005 | Yokota et al. | 709/245 |
| 2005/0251566 A1 * | 11/2005 | Weel | 709/219 |
| 2006/0085351 A1 * | 4/2006 | Hug | 705/59 |
| 2006/0195479 A1 * | 8/2006 | Spiegelman et al. | 707/104.1 |
| 2006/0212442 A1 | 9/2006 | Conrad et al. | |
| 2006/0212444 A1 * | 9/2006 | Handman et al. | 707/5 |
| 2008/0021577 A1 * | 1/2008 | Ijichi et al. | 700/94 |
| 2009/0056525 A1 * | 3/2009 | Oppenheimber | 84/609 |
| 2009/0099670 A1 * | 4/2009 | Harris | 700/94 |
| 2009/0119614 A1 * | 5/2009 | Tienvieri et al. | 715/786 |
| 2009/0249222 A1 * | 10/2009 | Schmidt et al. | 715/751 |
| 2010/0185662 A1 | 7/2010 | Barile | |
| 2011/0078323 A1 | 3/2011 | Wooden | |
| 2011/0213769 A1 | 9/2011 | Handman et al. | |
| 2012/0260302 A1 * | 10/2012 | Harris | 725/133 |
| 2012/0323938 A1 * | 12/2012 | Skeen et al. | 707/754 |
| 2013/0031216 A1 * | 1/2013 | Willis et al. | 709/219 |
| 2013/0110921 A1 * | 5/2013 | Logan et al. | 709/204 |
| 2013/0198264 A1 * | 8/2013 | Hellman et al. | 709/203 |
| 2014/0046775 A1 * | 2/2014 | Harb | 705/14.66 |

* cited by examiner

*Primary Examiner* — Alina N Boutah
(74) *Attorney, Agent, or Firm* — Law Office of Scott C Harris, Inc (57) ABSTRACT

An Internet content delivery system provides information to a number of different users. The system attempts to provide the same information to many different users while also providing the illusion to each of the users that they were receiving the content individually. The system attempts to minimize individualized bandwidth allocation by sending the same information to multiple different users while taking into account individualization requests of the multiple different users. An Internet or a playlist creator is also defined which allows a number of different items to be presented at different times depending on the playlist setting of the playlist.

17 Claims, 6 Drawing Sheets

CONTENT DELIVERY SYSTEM WITH CUSTOMIZABLE CONTENT

BACKGROUND

Content can be delivered to computer-based "clients" in various ways. For example, the computers can store content, receive content over a network connection from a virtual private server (in essence receiving prestored content) or receive it from a content delivery website. Popular content delivery websites include video delivery systems such as Netflix™ and HULU Plus™, that deliver video content on demand.

One form of audio delivery systems are called Internet radio channels. Some internet radio channels deliver preconfigured types of content to different users.

The content referred to by the present application includes any kind of multimedia content, video, audio, or any other kind of content, delivered over a common channel to multiple users. The common channel would typically be the Internet, with a number of different users receiving content from the central server at the same time.

There are different kinds of Internet channels such as Internet radio stations for Internet video stations. One kind of channel in essence mirrors the way channels work in standard broadcast TV. The channel is always transmitting, and a user can tune into that channel at any time. When the user turns into that channel, the users content starts playing perhaps in the middle of a song or program. On some of these channels, the user can time shift backwards in time to listen to, e.g., an hour back. However the user knows that no matter what channel they tune into, they and other people are receiving the same content at the same time (or a time shifted version of the same time).

Other stations, such as Pandora™ provide personalized content to a user. When the user starts the Pandora station, they get their own specific content. The content starts being sent to the user at the time the user starts listening. Users can personalize the content by adding more information about what they like and dislike, e.g. with thumbs up thumbs down, or by adding different genres. The content can be stopped or paused at any time. This further provides a personalized experience for the content delivery.

SUMMARY

The present application describes a content delivery system and technique that can provide an improved user experience for both receiving content more efficiently, and receiving more of the content that the user wants while minimizing the amount of unique bandwidth that is used by providing the same content to multiple clients.

BRIEF DESCRIPTION OF THE DRAWINGS in the drawings.

DETAILED DESCRIPTION

The present application refers to Internet delivery of content. In an embodiment, the system describes Internet delivery of music, such as in an Internet radio station such as Pandora™. However, and as explained throughout this application, the techniques described herein can be used for different kinds of content being delivered in this way, and the same techniques which are described herein can be equally applied to all the different kinds of content to be delivered.

Figure 1:
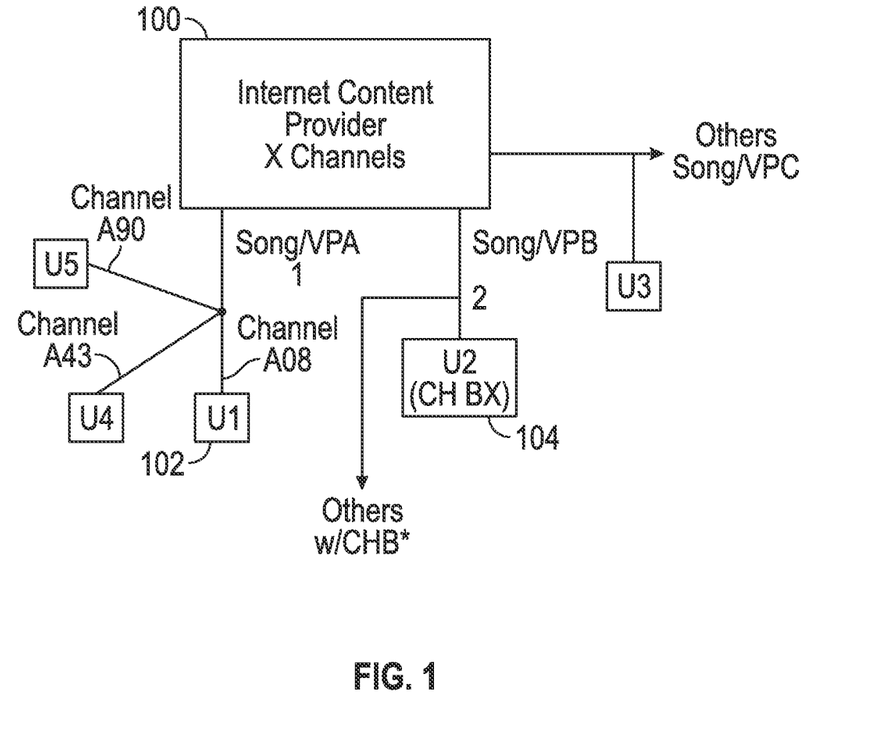
FIG. 1 shows a basic block diagram of content delivery system.

Taking the example of Pandora shown in FIG. 1, however, consider the following problem. Pandora may have many different channels of content that is being delivered. For example, a first user may be playing a kind of customized rock and roll channel, here Velvet Underground style rock and roll. This is shown in the figure as computer 100 delivering channel 1 to the user number 1, shown as 102. User number 2 is being delivered a different channel, which we will call channel 2. Channel 2 may be a 60s rock and roll station. Channel 2 overlaps with channel 1, in that the same kinds of songs might be played. At any one time user 2 his receiving song 2, while user 1 is receiving song 1. In an analogous way at any one time, user 3 is receiving song 3 from a different station.

In some instances, the genres of the stations may be overlapping. For example, Channel 1 and channel 2 may overlap as above. Channel 3 may be a country music station, and may have some overlap with the other channels, but in general is a different genre.

The inventor recognizes that when the genres overlap, there is an opportunity for multiple users to receive the same song. However, a point of customized Internet radio is to create the illusion that each user is receiving their own individual radio "station".

Prior art systems have responded to this desire for each user to receive their own station by individually streaming content to each of a number of users. The inventors recognizing that this creates the need for massive amounts of bandwidth.

According to a first aspect, a bandwidth reduction scheme is described in which the server computer carries out operations which allow sending the same song to multiple users at the same time.

In one embodiment, a score is maintained to attempt to minimize the bandwidth. This score is based on for each user the genre they have requested, the individualization have requested (in the case of Pandora thumbs-up and thumbs down, for example) advertisements, and others.

Another embodiment creates content for a virtual user and adds customization beyond the content for the virtual user. Many clients receive the same content for the virtual user, but the content is also customized. The virtual user is created for each of a plurality of super genres. Each super genre has many different genres underneath it. The virtual user will receive certain kinds of content that are generic to all the genres within the super genre. In addition, however, the virtual user also receives certain kinds of customization. In one embodiment, the virtual has provision for customization.

Figure 2:
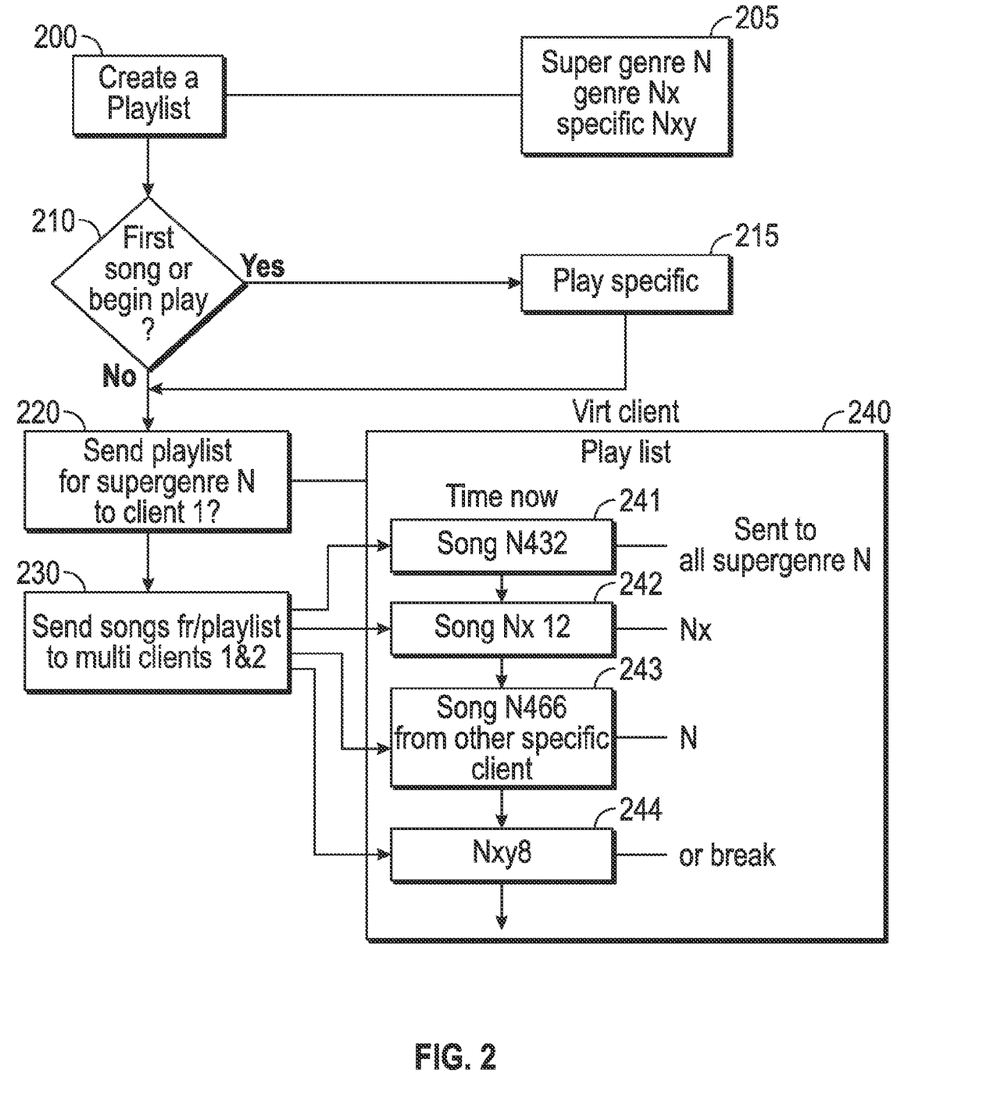
FIG. 2 shows a flowchart of operation according to an embodiment.

The operation of creation of the playlist, that is the list of content to be delivered to clients, is shown in the flowchart of FIG. 2. The playlist of FIG. 2 can be either an individualized playlist for each user, or can be a playlist for virtual user where the content of the playlist is intended to be received by many different users. A point, however, of the FIG. 2 flowchart is to attempt to get multiple different users to receive the same content at either exactly the same time, or at a similar time while maintaining the user's feeling that the content being delivered to them is unique to them.

The best bandwidth utilization would occur at least in one embodiment, if the same content could be sent to multiple users to play at the same time. However, the customization will cause what users play to differ. As explained herein, one embodiment attempts to make an individual playlist for any user x, conformist close as possible to the virtual playlist for the virtual user. The user playlist may be out of sync with the virtual playlist. The measure of time similarity is referred to herein as Tn. Tn represents the time between the song on the virtual playlist and the song on any users playlist One important feature of the playlist is to provide customization to the user beyond the common content that is provided to many users. Providing customization at various times during the playlist will provide the user with a feeling of customization. The playlist, therefore, has certain sections that are reserved for customization that is completely custom to a particular user.

In the flowchart of FIG. 2, the first song that is played will be customized to the user, and at certain times during the operation, there will also be customization breaks or customization songs that are customized to the specific user. When the user first starts playing the station, it is important that the user will immediately receive some content starting at the beginning of the song, so that the user can obtain the illusion that the radio station is being individualized for that one user. The user can also pause the radio, and the pickup will pick up exactly where the pause left off. Again, this provides the illusion of individualization. However, the computer system and the website begins taking steps to attempt to de-individualize the content, and to provide the content to as many users as possible and to provide the content of the virtual playlist to as many users as possible.

The operation starts at 200 by showing the operation of creating a playlist for a specific user. Note that the playlist created for the specific user actually be a playlist created for the virtual user who best fits with the specific user. The playlist is created based on different parameters associated with the user. The creation of the playlist 200 first defines the genres associated with the user. In this embodiment, the genres each receive a variable number, which can be a numeral or an alphanumeric. The genres associated with the user or the station of the user include in this embodiment super genre N, sub genre x, mak the total variable for the super genre and sub genre Nx, and specific artist y, making the total variable Nxy for the most specific level, formed of the different levels of specificity in the genre.

Supergenres can be individualized into multiple broad groups, such as vintage rock (anything before 1980), blues, modern; top 40, and other super genre categories.

The stations can be selected from a number of predefined stations, for example station number 6 might be sixties. The stations in the case of Pandora are selected by selecting an artist, and then the user receives other artists that are like the artists they selected.

A point of this embodiment, however, is to provide the user with an illusion that they are receiving customized content. Tuning in on the Internet to a real radio station would involve each of a number of users receiving exactly the same content. If you tuned in at time x, you would receive content starting at time x, perhaps in the middle of the song. Some Internet content stations allow backtracking on the station, for example Sirius XM's Internet station allows a user to listen to the past hour of content. However, this remains real-time radio. Starting at the moment when the radio station is selected in real-time radio, the user gets whatever is playing. According to the present embodiment, the user receives content that appears to the user to be individual for the user. This provides the effective illusion that the user is getting their own personalized content. At the same time, the system takes actions as described herein to drive all of a number of different users to receive the same content at almost the same time. Therefore, this provides the best of both worlds: the illusion of individual content to the user, while minimizing the bandwidth load on the system.

At 210, the system determines if this is the first song being played or is playing is just beginning, such as when the user has caused the playing for a time. If so, very individualized content is sent to that user. For example, if the user has requested the velvet underground station, the user will receive a velvet underground song as their first song at 215. The broad genre is set to 60s underground rock, which has classifier number A2 in this example, or some other genre based on classifying the velvet underground in this way. User 1 who is requesting this station immediately receives a velvet underground song. That song is also, however, sent to others who are listening to the same super genre, to be played as part of their station, if possible. This song is also, however, sent to others who are listening to the genre A2 at 220, and if possible also to all who are listening to all of the supergenre A, here vintage rock.

In an embodiment, a playlist is created for each client. However, the playlist can be a generic playlist created for the virtual client which includes customization for each individual client. The playlist creation is shown at 240. The playlist is created in order where the time "now" a specific song is being played here song number and 432. This song is being played to all the users in super genre and. The songs for the playlist are being sent to multiple clients e.g. clients 1 and 2 at 230, however it should be understood that the songs conflict sent to thousands of clients. Other songs in the playlist are also created and also sent to multiple clients at the same time. Song number NX 12 is put on the playlist at 242 and also sent to every client that has the genre NX. The next song, at 243 may be again a song for all super genres in an, sent to but this one is received from the specific song being sent to 215, to some other client. Therefore, the specific song at 215 that is being played for some other client is also added to the playlist of the virtual user. At 244 a specific song NXy is being sent to all the users of NXy. As an alternative to NXy, in the situation where the playlist is being created for virtual user as compared with the specific user, 244 may actually be a space indicating customization for the user, and they provide for example 3 minutes of customization requiring the system to either find a three-minute song or modify some existing customization song to fit within the customization interval.

The playlist creation continues, by attempting to sync each individual playlist with the virtual user playlist as much as possible.

In this embodiment, songs are real-time streamed to each of the different users, and stored in the user computers. The playlist is also sent to the user computers, telling the user computers to play the songs in the specified order. That is, when the first song 210 is sent, the playlist instruction instructs the computer to play that song immediately. That song is also sent to others in genre N and/or Nx, and the playlist instructs that song to be played at an appropriate time. Other group songs are also been received, and the playlist instructs that these song played at appropriate times. In this way, any time any song is to a client, it is sent to other clients at the same time. The songs can be stored in cache in the clients, and then played later.

Another embodiment, however, may attempt to avoid the caching of songs in favor of real-time streaming. This may be done for many reasons. In general, thinner clients such as phones and low-power tablets, for example, may have less ability to store cached songs of this type. Also, caching whole songs to be played later may actually create copyright issues, since the songs would actually be stored rather than being real-time played. Owners might object to their songs being stored in cache, since this would perhaps permit hackers to retrieve those songs from cache.

The embodiment of FIG. 2 sends the songs to be played, and supposes that the songs will be stored in memory until instructed to be played by the playlist. The embodiment of FIG. 3 attempts to carry out real-time streaming. The real-time streaming may not be real time, for example the song may be sent faster than it is being played, so that some of the song is still cached. However, the embodiment of FIG. 3 attempts to minimize the amount of time between the sending of the song and the playing of the song. For this reason, this is not an actual real-time streaming embodiment, but is rather a semi-real-time streaming embodiment.

Figure 3:
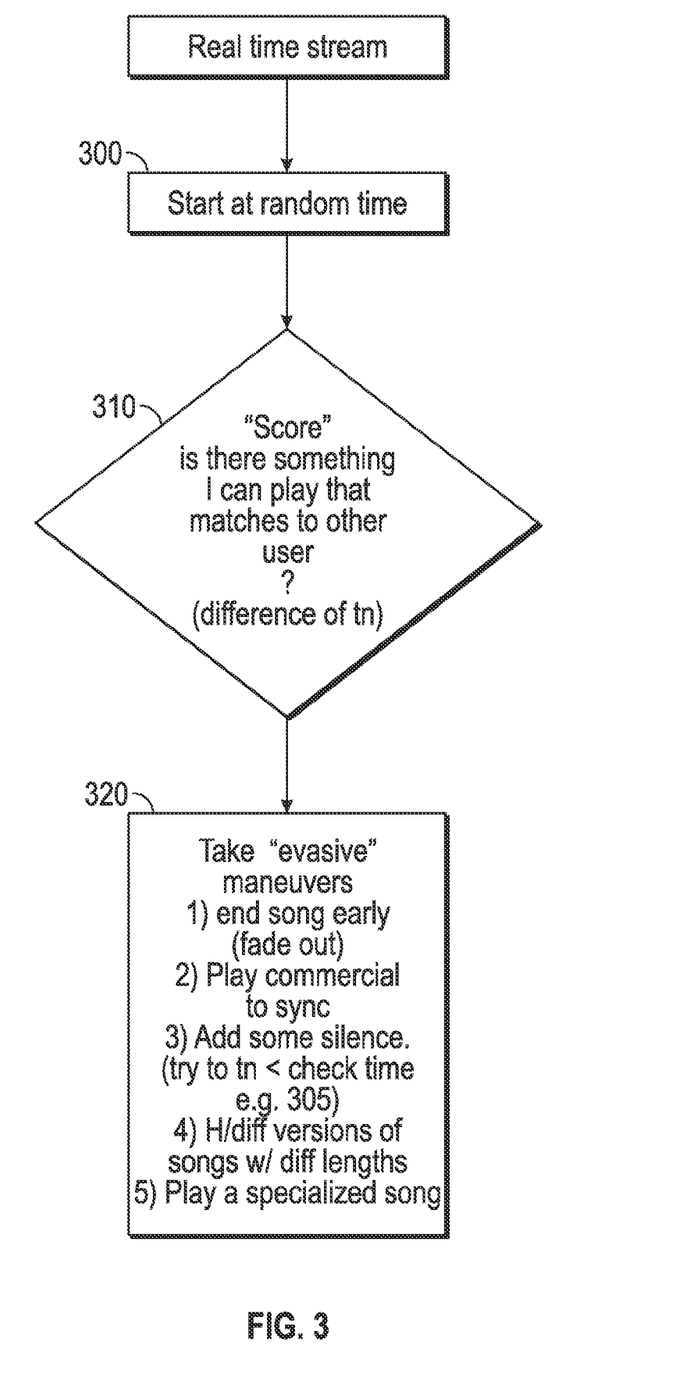
FIG. 3 shows a flowchart of an alternative embodiment that avoids real-time streaming.

In a real-time streaming environment (and in the semi-real-time streaming embodiment of FIG. 3), songs will start in essence at a random time, shown as 300 in FIG. 3. At 310, a score is maintained for each of a plurality of clients. That score determines is there something that can be played at any given time that matches to another user. A difference of Tn is defined, where Tn represents the synchronization difference between the virtual user and user x.

In this embodiment, therefore, a playlist is being created for each of the clients, where the playlist is attempting to synchronize multiple clients to receive and play the same song at substantially the same time that is as close to the same time as possible. As in the FIG. 2 embodiment, the playlist can be a customized version of a virtual playlist for a virtual user. The virtual playlist for the virtual user includes places where there can be customization for the specific user. Also, the virtual playlist maybe modified for the specific user based on the user's preferences, e.g., "thumb" settings of what the user likes and doesn't like.

The different clients are managed so that the difference between what they are playing is minimized. That is, many different clients are playing the same song at either the same time or at virtually the same time. The playlist can also be a specific playlist for the specific user, again while managing the different clients to play the same song at the same time. The remainder of this embodiment will be described with reference to the virtual playlist.

This embodiment attempts to manage the systems so that multiple clients are synchronized that is they play the same song at substantially the same time, separated by the synchronization difference Tn. The synchronization difference Tn represents the difference between when the client will play the song, and when it is being delivered by the virtual user.

In order to manage the multiple different clients, 310 represents a score. The score can be the value Tn, discussed above, that represents the difference between what the time that something will be played by the client and the time that it is set to play on the virtual user playlist.

The score can also be or include a measure of for each of a plurality of different songs or other content, of how well does the song match the genre that the user has requested, how well does the song match preferences such as thumbs-up and thumbs down, and how many people can the song be sent to at one time.

In order to maintain the clients synced with one another, The system instructs each of the clients to take "evasive" maneuvers. The evasive maneuvers are carried out in order to attempt to sync each client with the virtual user receiving the virtual stream. The evasive maneuvers are shown in 320. The point of each of these evasive maneuvers is to minimize the Tn between the time that a song will be played, and the time the song is provided to the user. The Tn is used to create a playlist for users.

As in the above, in one embodiment a virtual playlist is created for a virtual user, and each of a plurality of users use the same playlist as customized for the individual user. The Tn then represents the difference between the time when the user is playing something and the virtual user playlist.

For example, if the Tn indicates that the virtual user is 15 seconds ahead of what the client is playing, the client can end the song early such as fading out in a way that gains back the 15 seconds. Other evasive maneuvers can be used for short and long periods of time. A commercial can be played, for example, to delay the operation in an attempt to sync. Different lengths of commercials could be used. A period of silence could also be used. When playing songs, there can be different versions of the song. All of this is done to try and minimize the Tn time.

In one embodiment, a maximum cache time is defined, and to is brought down to be less than that cache time for most of the operation time. For example the Tn may be required to be less than 30 seconds or 3 minutes, at all times, and evasive maneuvers at 320 can be taken any time the cache time becomes greater than the minimum cache time. In another embodiment, evasive maneuvers may be taken any time the Tn or the amount of time that something needs to stay in cache, becomes more than 5 minutes.

Figure 4:
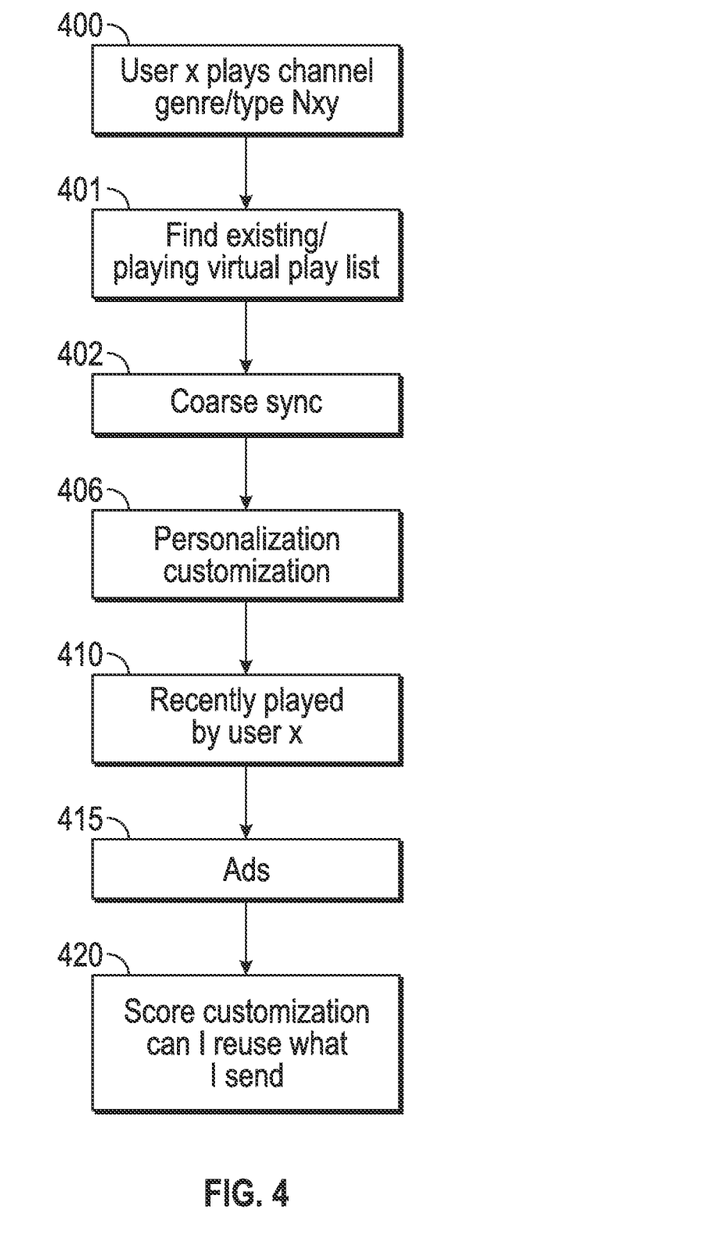
FIG. 4 shows a flowchart of operation carried out in a server of the content delivery system.

For each of the plurality of clients, the database in the head end carries out a number of different steps to determine the playlist to be created as shown in FIG. 4. This can be carried out, for example, any time that a user starts playing any particular channel. Each of the clients is referred to as user x. 400, this determines what it can find out about user x, for example the genre, type and the like using the techniques described above. For example, this can describe the genre and type Nxy in the form described above.

At 401, the system finds an existing virtual playlist which is currently playing for some other user. As explained above, the system will attempt to use the currently playing virtual playlist that it can fit to the type NXy.

Once finding that playlist, the system can carry out steps 210/215 from FIG. 2 and other at step 402, to establish a coarse sync to the existing virtual playlist. What this does, therefore, is to play something customized for one or a few songs in order to bring user acts into sync with the existing virtual playlist. The system can then also carry out the other functions of FIG. 2, in addition to carrying out additional synchronization.

The customization from the virtual user includes personalization exclusions such as 405. In the case of Pandora, these exclusions can be from thumbs down. The exclusions can also include customizations, such as from thumbs-up.

Other exclusions can include what has been played recently at 410. Note that the virtual user would create a playlist was already takes this into account. However, user acts may have played the radio station 2 days ago, and then be playing it again. What has been recently played individually by user x may therefore be taken into account as part of the customization.

Also going into creation of the playlist for the virtual user can be advertisements at 415, e.g., some artists who have paid to get their song(s) played on the station.

420 represents score customization, where the different items that can be sent his customization material are scored according to different criteria. One of the scores shown at 420 is based on 'can the item be reused', that is if I send something customized to user x, can I also tell others to receive that song at the same time? This increases the score for that particular item.

For example customization for Velvet Underground may be scored higher at a moment when it can be sent to another user. User x may also receive songs in their playlist that are customized for some other user. The highest score customization item may be sent as part of 420.

Based on all of the above, the playlist is created for the virtual user, and modified for user x. The playlist for the virtual user is a generic playlist for the genre. That playlist sets songs to be sent to many different users.

Modifications to that generic playlist are sent to create customization for the specific users.

At all times, the system attempts to change the playing to minimize the "cache" time between what any specific client is playing, and what is being set to that specific client.

While the customization is specific to a specific user, however the system attempts to use any customization by providing the content of that customization to some other user. That content will not be specific to the other users, but maybe sufficiently close to the genre they can be reused. The point is to send the same song, song 1 in FIG. 1 to both user 1 and user 4 at the same time even though these users may have tuned into the station at different times and even though these users may be listening to different channels.

The content described herein can be delivered in multiple ways, for example to a general purpose computer or tablet, via a website access, or via an application. This can be a free service, in which case it is typically supported by advertisements, or alternatively can be a subscription where you pay by time, or paid by credits. The above has described actions taken by a server computer, however, the techniques described herein are also applicable to an executable on a client computer, for example the client computer can receive certain information of the type described herein.

Another application delivers this to a specialized appliance such as an Internet radio appliance or Internet video appliance that comes with some credits e.g. is delivered with 50 credits per month for the next 12 months. In this embodiment, however, while any of the free services or monthly services may be used, a particular embodiment describes credits being used.

Figure 5A:
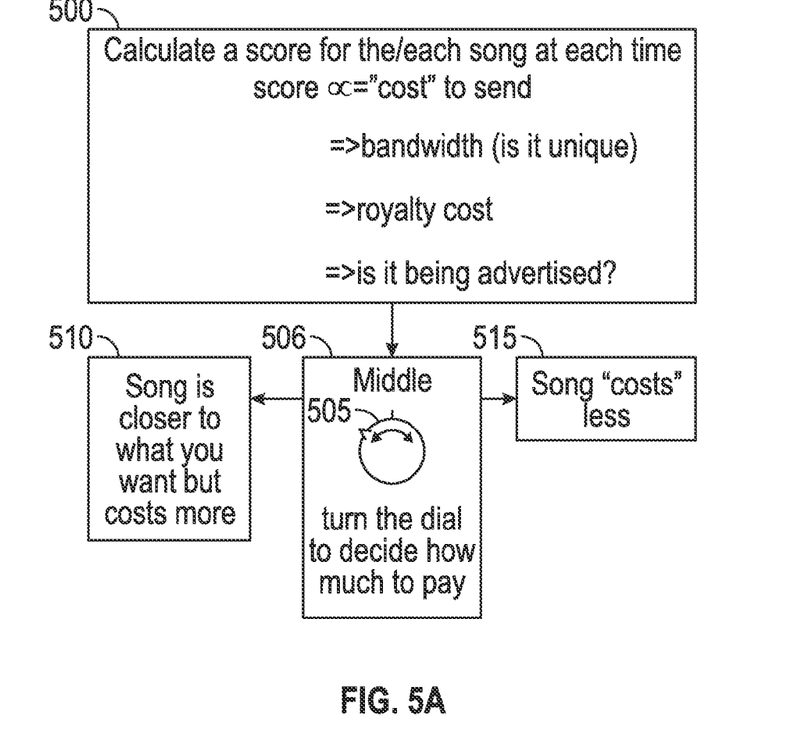
FIG. 5A shows a scoring technique used with a control system as disclosed herein.

In an embodiment, a score for each song at each time is calculated at 500. That score is proportional to the "cost" to send. The score is based on sending bandwidth, royalty costs, and whether a particular song is one that is being advertised in one form or another. A song that is closer to what the user wants but costs more (in terms of bandwidth or royalty costs) may use more credits. A song that is more generic, in that it can be used for many different clients, may "cost" less. In one embodiment, a dial 505, either virtual dial or others on may be used for the user to decide how much they want to pay at 506. If the dials all the way in the middle, the system may provide some kind of balanced presentation of information. The dial can go all the way to the left to provide songs that are closer to what the user wants but cost more at 510. At the setting 510, the system will deliver more customized content, but will charge some amount of credits per unit time of content delivery. The dial 505 can go all the way to the other direction to provide songs that "cost" less at 515. For example going all the way to the right on the dial 505 may provide only free content. However, moving slightly to the left may use up some credits to provide a more customized version of the content. The amount of customization versus fees is set by the position of the dial. In one embodiment, the user can listen to completely free radio or watch completely free video by turning the dial to one side; and the user can increase the customization by turning the dial to the other side.

The dial 505 in FIG. 5A describes a dial that acts like a slider, where the dial can be moved either to the right or to the left, or anywhere in between. However, more complicated controls such as the dial 525 shown in FIG. 5B may also be used. In the dial of FIG. 5A/5B not only is the cost vs customization selectable, but also the genre. There can be multiple different favorite channels, a favorite channel 1 of Lou Reed at 520, the favorite 2 of Lynyrd Skynyrd at 530, and others. The user can build their own playlist by dragging the different favorites and, for alternatively can use the style to switch between the genres. The dial can also include a cost minus and cost-plus setting shown as 526 and 527. For example, the cost-plus/cost minus may be a slider or may be a plus minus clicker that changes the color of the dial as the value is changed.

Figure 5B:
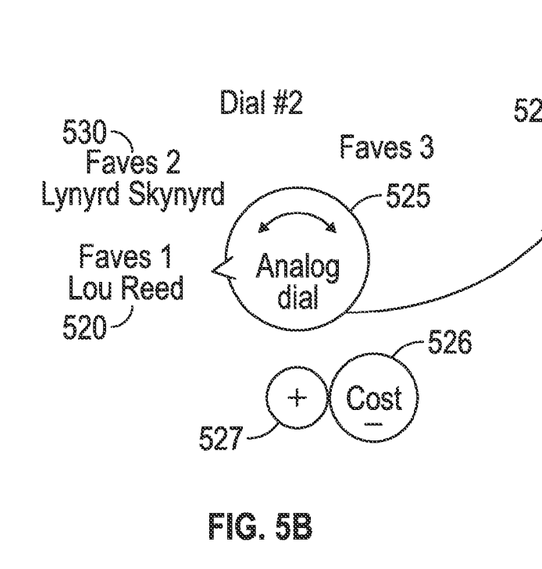
FIGS. 5B and 5C show different control systems that can be used according to embodiments.
Figure 5C:
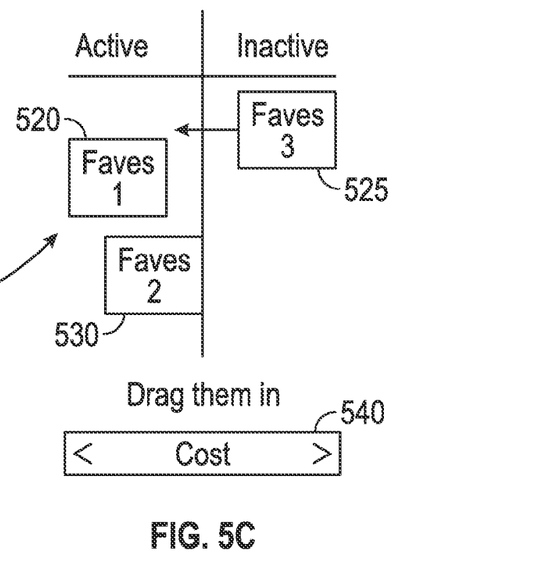

FIG. 5C shows yet another control, where different channels are "dragged" to different locations, the first favorite channel 520 has been dragged into the active location in a first active spot, while the second favorite channel favorite to 530 has also been dragged into active but not as far into it. In a similar way, favorite 3 525 remains in inactive. In one embodiment, distance to which the favorite channel is in inactive may also set whether songs from the non selected channel are provided. In the same way, as part of this, this system can include a cost slider shown as 540, which can go side to side, change the color, change the brightness, or the like. As in the above embodiment, the user can listen to completely free radio or watch completely free video by turning the dial to one side; and the user can increase the customization by turning the dial to the other side. The amount of customization which the user receives on their "channel" will depend on the cost they have selected.

The control dials can do a few different things. First, by changing the channel, the user changes the customization that they receive. For example, by going between two different channels, the user may receive 50% customization attributable to one channel and 50% customization attributable to the other channel. Each channel may still use the virtual user techniques described above. However, when the user changes the amount of "cost" that they're willing to pay, this may also change the amount of customization they receive. For example in one embodiment when a user pays full cost, they may receive full customization from only the genres they have requested. The dials allow changing the kind of customization and the amount of customization.

Moreover, although the above describes dials, any analog or digital way of controlling may be used to control this customization.

Figure 6:
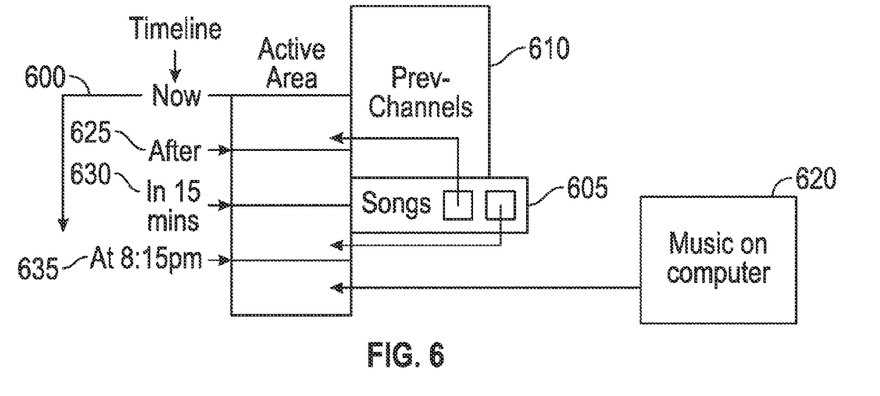
FIGS. 6 and 7 show embodiments of playlist by timeline.

Any of the embodiments described above can also be used with a playlist builder as described herein. The playlist builder creates a playlist for the user which combines information from multiple other sources. Some of the items on the playlist are from channels, e.g. channels that have been built as described above. In this system, therefore, when the user builds their own playlist, some items in the playlist are from channels, and other items in the playlist are from other sources. FIG. 6, for example, shows a playlist builder. The playlist is shown basically as a timing diagram with the playlist extending over time from a current time into the future. The current time of now is shown as 600 as what's in the active area. The active area can be a specific song taken from a specific song selector 605, can be a channel taken from previous channel selector 610, and could also be specific music on the user's computer or on some cloud-based storage, shown as 620. At any point in the timeline, the user can drag in either a channel, a specific song, or any combination. The timeline starts with now at 600, but can also include other timing details such as 'after the current song finishes playing' at 625, 'a fixed time after that' such as 15 min. after that at 630, or at a specific time such as 635 at 8:15 PM. Any of these can be set as hard times, meaning exactly at 6:15 PM you would change the channel, or can be set as soft times, such as at the next song break after 6:15 PM please change. Any of these time selections are in essence cues, since they can be a specific time, or a relative time (such as when the song is over or 15 minutes from now. These can be referred to, therefore, as temporal cues.

When you put in the specific songs at 605, they can be songs that are either on the computer, or songs to be obtained from some repository. The repository songs might cost a certain amount of money to play once, or may require the user to add them to their library e.g. using an iTunes type model where the song is paid for once and then added to the user's library. In the same way, the selection of specific songs at 605 may be used to automatically modified the channel 610 which was previously playing or playing in the future, that is to provide further customization to the channel.

Figure 7:
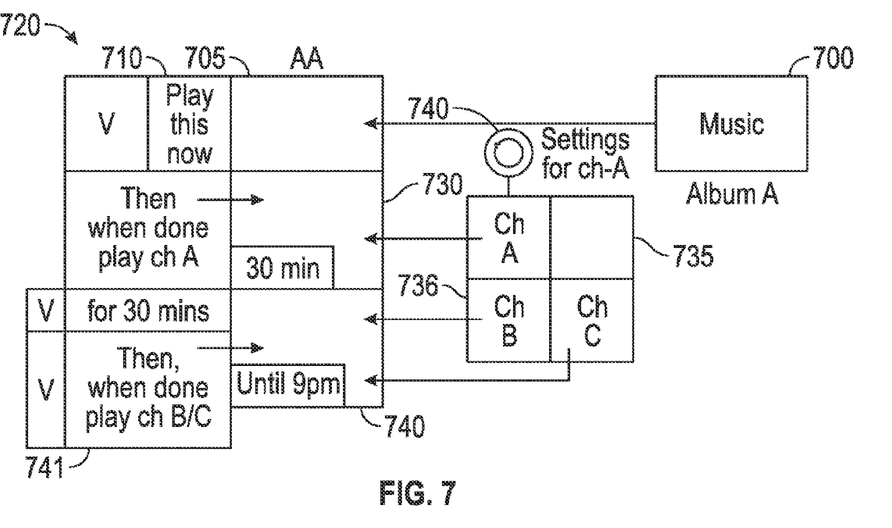

FIG. 7 shows another version of the timeline creator, which can be used along with the FIG. 6 embodiment, or on its own. Again, items can be dragged into the timeline, and each time an item is dragged in, its temporal association can be set. FIG. 7 shows music from the computer 700 being dragged into the timeline 705. A drop-down list indicates when this should be played. 710 shows selecting from this drop-down list to 'play this now'. Other choices, however, can include play this when the current song is over, play this in 20 minutes, or the like. Therefore, while you can drag into the timeline at any location, dragging into the timeline can be overridden or changed by the temporal consideration button 710.

In FIG. 7, when the music is dragged to the top of the timeline, e.g. at 705, the temporal consideration 720 may default to the information being at the top of the timeline, that is the temporal consideration made in default to "play this now". However, the next choice in the pulldown list may be the next most common thing you would do when the current song is over. After that may come other possibilities. The other possibilities are all those described herein, in 15 minutes, at 815, when the current song is done, when the next song is done, and the like.

The next spot 730 in the timeline may be an Internet radio station shown in 735, set using settings from the special dials described herein reference to FIG. 5A or 5B. Since this is being dragged after the music of 700, the next thing this says it the first thing that the temporal selector says defaults to "then when done play channel from dial". A second part of the request is for how long, here being selected for 30 minutes. The user can pull a specific channel such as channel B here shown as 736 into the timeline at 742 play after that 30 minutes is over. Here, since the user has specified how long they want to play for the default temporal selector is then when done shown as 741. Next, the length of time that this next channel may be played maybe specified, or may be left blank.

Figure 8:
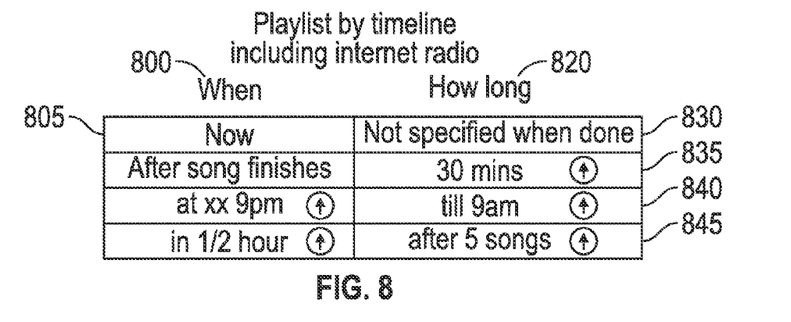
FIG. 8 shows a menuing system for the timelines.

FIG. 8 shows some example pulldown menus that can be used in the temporal selectors. The temporal selectors include when and how long. The when part 800 can include now at 805, after the song finishes at a set time e.g. 9 PM, or in a set interval in half hour. The amount of time that the part is playing can also be specified by the 'how long' at 820, between not specified 830 which can include when the song is done, or 30 minutes at 835. Any of these time setters may include a graphical timer part 836 where the time can be dragged to a time, for example this can allow the user to drag this to 8 PM, or to 30 minutes, or to the like. 840 may include until 9 AM and 845 may specify a number of songs such as after 5 songs have played, again with a graphical item to allow dragging this to the graphical amount of time.

The above has described many specific items, and how this can be used with Internet radio. This can also, however, be used with other forms of content delivery such as video-on-demand and the like. Video can be used in a similar way to audio, where a user can request content where the content can be delivered depending on how much the user is willing to pay for the content. When the user wants a free station, the station may provide content to many different users, in different genres. The many different users each receive a playlist for the virtual user, which is customized for the specific user and the specific user is given an illusion of interactivity. When the user is willing to pay more for the content, the user may get purely interactive content.

Other techniques may also be used. For example, for streaming video, users may be provided either filler content, or made to wait in order to sync with others, unless the users agree to pay extra for real time interactivity. Alternatively, evasive maneuvers may be taken as in the above, to attempt to send content that matches the requested genre to the user. As in the above, this can send video to multiple different people, where the same video is sent to multiple different people who have requested different things. This is also done while providing the illusion of interactivity. As in the above, this can provide a unique stream for some time, while taking evasive maneuvers to synchronize the stream with what is being given to others.

Another embodiment describes operating such a system on an as part of a social networking site. This may be part of an existing social networking site such as Facebook, or alternatively, can create a social network site or plug into a social network site that includes the information from the selection of music as one of the pieces of information being monitored on the site. For example any time the user plays a song, that may be used as a criteria to find other users who like the same kind of music as the one user.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of content can be delivered. Including video-on-demand, and other kinds of content on demand using the same techniques. Any kind of content can be delivered in this way.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form. This may include laptop or desktop computers, and may also include portable computers, including cell phones, tablets such as the IPAD™, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An internet content delivery system, comprising:
a server computer, operating to provide content to a number of users, where the server computer operates to initially provide individual content to a first user when the first user initially requests the content, and after providing the individual content to the first user, to provide the same content to the first user that is provided to other users other than the first user,
said server computer providing a control which allows a user to set an amount of desired customization as a function of how much the user will pay for the desired customization.

2. The system as in claim 1, wherein the server computer determines a length of time between the content being delivered to the first user and the content being delivered to the other users, and provides content to the first user that brings the first user closer into sync with the other users.

3. The system as in claim 1, wherein the server computer creates a virtual playlist that is used for multiple of said users, and takes actions for each of said users to cause the content provided to said each of said users to stay in sync with said playlist.

4. The system as in claim 3, wherein said actions include keeping said each of said users within n seconds of the virtual playlist.

5. The system as in claim 3, wherein said actions include terminating content before a normal end of the content.

6. The system as in claim 3, wherein there are multiple versions of the content, and said actions include selecting one of said multiple versions that has a time that more closely syncs the user to the virtual playlist.

7. A system comprising:
a client computer, receiving content over the Internet,
wherein said client computer initially receives individual content when the client computer begins playing a content channel, and after receiving the individual content, receives the same content that is provided to other client computers at the same time that the other client computers receive said content,
wherein said client computer receiving a control which allows setting an amount of desired customization as a function of how much the user will pay for the desired customization, wherein said control enables selecting multiple levels between full customization of the content for payment, and less customization of the content for less amount of payment.

8. The system as in claim 7, wherein the client computer receives content that has a length that brings the client computer closer into sync with the other client computers.

9. The system as in claim 7, wherein the client computer receives a virtual playlist that is used for multiple of said client computers, and receives content to stay in sync with said virtual playlist.

10. The system as in claim 9, wherein said sync is staying within n seconds of the virtual playlist.

11. The system as in claim 7, wherein said control is a virtual dial.

12. The system as in claim 7, wherein said control also includes a capability of indicating a genre of content to be received by the client computer.

13. The system as in claim 12, wherein said control allows selecting multiple different genres at once.

14. A system comprising:
a client computer, receiving content over the Internet,
wherein said client computer includes a control that allows selecting multiple different items of content to play based on different temporal cues in the future, at least one of said items of content is a channel on an internet content receiving service, and another of said items of content is from a repository that is specific to a user of the client computer,
where said client computer plays said channel and said another item at times indicated by said temporal cues
and where said client computer receives providing a control which allows the user to set an amount of desired customization as a function of how much the user will pay for the desired customization.

15. The system as in claim 14, wherein said client when playing said internet content receiving service initially receives individual content when the client computer begins playing a content channel, and after receiving the individual content, receives the same content that is provided to other client computers at the same time that the other client computers receive said content.

16. The system as in claim 14, wherein said repository is a local hard drive of the client computer.

17. The system as in claim 14, wherein said temporal cues include an indication that an item of content should be played starting in a time at the future, but also reference to a moment when playing content is finished.

* * * * *